(12) United States Patent
Khataniar et al.

(10) Patent No.: US 9,051,825 B2
(45) Date of Patent: Jun. 9, 2015

(54) VISUALIZING FLUID FLOW IN SUBSURFACE RESERVOIRS

(75) Inventors: Sanjoy Kumar Khataniar, Abingdon (GB); Milan Frank, Abingdon (GB); Frode Bratvedt, Asker (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 764 days.

(21) Appl. No.: 13/013,983

(22) Filed: Jan. 26, 2011

(65) Prior Publication Data

US 2012/0191432 A1 Jul. 26, 2012

(51) Int. Cl.
| | |
|---|---|
| G06G 7/48 | (2006.01) |
| E21B 43/14 | (2006.01) |
| E21B 43/00 | (2006.01) |
| G06T 11/20 | (2006.01) |
| G06T 19/20 | (2011.01) |

(52) U.S. Cl.
CPC .............. *E21B 43/14* (2013.01); *G06T 11/206* (2013.01); *G06T 2200/24* (2013.01); *G06T 19/20* (2013.01); *E21B 43/00* (2013.01)

(58) Field of Classification Search
None
See application file for complete search history.

(56) References Cited

U.S. PATENT DOCUMENTS

| | | | |
|---|---|---|---|
| 4,181,176 | A | 1/1980 | Frazier |
| 4,210,964 | A | 7/1980 | Good et al. |
| 4,745,550 | A | 5/1988 | Witkin |
| 5,377,104 | A | 12/1994 | Sorrells et al. |
| 5,455,902 | A | 10/1995 | Ellson et al. |
| 5,459,820 | A | 10/1995 | Schroeder et al. |
| 6,106,561 | A * | 8/2000 | Farmer .......................... 703/10 |
| 6,519,531 | B1 | 2/2003 | Batycky |
| 6,775,578 | B2 | 8/2004 | Couet et al. |
| 6,885,942 | B2 | 4/2005 | Shray et al. |

(Continued)

FOREIGN PATENT DOCUMENTS

| | | |
|---|---|---|
| WO | 0140937 A1 | 6/2001 |
| WO | 2010059288 A1 | 5/2010 |

OTHER PUBLICATIONS

Grinestaff Waterflood Pattern Allocations: Quantifying the Injector to Producer Relationship with Streamline Simulation SPE 54616, 1999.*

(Continued)

*Primary Examiner* — Omar Fernandez Rivas
*Assistant Examiner* — Cuong Luu
(74) *Attorney, Agent, or Firm* — Rodney Warfford; Colin Wier; Alec McGinn

(57) ABSTRACT

In visualizing flow in subsurface reservoirs, a system partitions flow information according to source-sink pairs and streamlines in a reservoir. The system displays dynamic streamline flow indicators and flow animations, such as 3D pie charts, to dynamically show flow contributions and properties at each well. A pie chart displayed at a producer well may have pie wedges that dynamically update to show the percentage of fluid being received via streamlines from each of multiple injectors. Highlighting the chart highlights all wells contributing to the output. Radial sections of each pie wedge may be further mapped to show the flow rate of components, such as oil, water, and gas phases in a streamline. Each chart may show many other properties and may be stacked across time steps. The system also displays streamline properties with animations, which demonstrate flow velocity and model properties, such as phase components, rates, volumes, etc., through color and size codes.

9 Claims, 9 Drawing Sheets

(56) References Cited

U.S. PATENT DOCUMENTS

| | | | |
|---|---|---|---|
| 6,995,768 B2* | 2/2006 | Jou et al. | 345/440 |
| 7,164,990 B2 | 1/2007 | Bratvedt | |
| 7,340,347 B2 | 3/2008 | Shray et al. | |
| 7,352,368 B2* | 4/2008 | Frazelle et al. | 345/419 |
| 2003/0051873 A1 | 3/2003 | Patzek et al. | |
| 2004/0015295 A1* | 1/2004 | Bratvedt et al. | 702/13 |
| 2005/0243083 A1* | 11/2005 | Frazelle et al. | 345/419 |
| 2007/0016389 A1* | 1/2007 | Ozgen | 703/10 |
| 2007/0168133 A1 | 7/2007 | Bennett et al. | |
| 2008/0115049 A1* | 5/2008 | Tolle et al. | 715/209 |
| 2008/0179094 A1 | 7/2008 | Repin et al. | |
| 2009/0070158 A1 | 3/2009 | Virine et al. | |
| 2009/0216341 A1* | 8/2009 | Enkerud et al. | 700/17 |
| 2009/0229819 A1 | 9/2009 | Repin et al. | |
| 2010/0079488 A1* | 4/2010 | McGreevy et al. | 345/629 |
| 2010/0206559 A1 | 8/2010 | Sequeira et al. | |
| 2011/0050562 A1 | 3/2011 | Schoen et al. | |
| 2011/0063292 A1* | 3/2011 | Holl et al. | 345/420 |
| 2011/0082676 A1* | 4/2011 | Bratvedt et al. | 703/10 |
| 2011/0187710 A1* | 8/2011 | Giovinazzi et al. | 345/419 |

OTHER PUBLICATIONS

Klump et al. Real-Time Data Retrieval and New Visualization Techniques for the Energy Industry Proceedings of the 35th Hawaii International Conference on System Sciences—2002, IEEE.*

Logenthiran et al. Multi-Agent Coordination for DER in MicroGrid ICSET 2008.*

GB Search Report of UK Patent Application Serial No. GB112081.6 dated Feb. 27, 2012.

Flanders, W.A. and Bates, G.R., "Optimizing Reservoir Surveillance by Using Streamlines and the Microcomputer," presented at the Petroleum Industry Applications of Microcomputers, Society of Petroleum Engineers, Jun. 23-26,1987, pp. 5-12, SPE 16482, Conroe, Texas, USA.

Woodling, G.S., et al, "Layered Waterflood Surveillance in a Mature Field: The Long Beach unit," presented at the Western Regional Meeting, Society of Petroleum Engineers, May 26-28, 1993, pp. 537-549, SPE 26082, Anchorage, Alaska, USA.

Tyrie, J.J., "Some Powerful Reasons for Adopting Front Tracking Simulation," presented at the Offshore Europe 95 SPE Conference, Society of Petroleum Engineers, Sep. 5-8, 1995, pp. 733-740, SPE 30444, Aberdeen, Scotland, United Kingdom.

Grinestaff, G.H., "Waterflood Pattern Allocations: Quantifying the Injector to Producer Relationship with Streamline Simulation," presented at the 1999 SPE Western Regional Meeting, May 26-28,1999, pp. 5, SPE 54616, Anchorage, Alaska, USA.

Thiele, M. and Batycky, R.P., "Water Injection Optimization Using a Stream-line Based Workflow," presented at the SPE Annual Technical Conference and Exhibition, Oct. 5-8, 2003, pp. 1-6, SPE 84080, Denver, Colorado, USA.

Chapman, L.R. and Thompson, R.R., "Waterflood Surveillance in the Kuparuk River Unit with Computerized Pattern Analysis," Journal of Petroleum Technology, Mar. 1989, pp. 277-282, SPE 17429.

Thiele, M.R. and Batycky, R.P., "Using Streamline-Derived Injection Efficiencies for Improved Waterflood Management," SPE Reservoir Evaluation & Engineering, Apr. 2006, pp. 187-196, SPE 84080.

Klump et al., "An Advanced Visualization Platform for Real-Time Power System Operations," http://www.powerworld.com/Document%20Library/Retriever%20Paper.pdf, retrieved Apr. 29, 2011.

"FrontSim Technical Description", 2007.

Baker, "Streamline technology: reservoir history matching and forecasting = its success, limitations, and future", Journal of Canadian Petroleum Technology, vol. 40, No. 4, Apr. 2001, pp. 23-27.

Klump, et al., "Displaying Aggregate Data, Interrelated Quantities, and Data Trends in Electric Power Systems", 36th Hawaii International Conference on System Sciences, Jan. 2003.

Stenerud, et al., "Adaptive Multiscale Streamline Simulation and Inversion for High-Resolution Geomodels", SPE 106228—SPE Reservoir Simulation Symposium, Feb. 2007, 15 pages.

Examination Report issued in CA2760529 on Feb. 21, 2013, 2 pages.
Examination Report issued in CA2760529 on Nov. 12, 2013, 3 pages.
Examination Report issued in CA2760529 on Aug. 7, 2014, 11 pages.

* cited by examiner

VISUALIZING FLUID FLOW IN SUBSURFACE RESERVOIRS

BACKGROUND

In underground reservoirs for hydrocarbons, water, natural gas, and other fluids, the fluid flows may be modeled through numerical simulation. Numerical reservoir simulation is often used to plan the development and operation of oil and gas reservoirs. The hydrocarbon reservoirs containing oil and gas are made productive by drilling boreholes or wells, referred to as producers or production wells.

As hydrocarbons are produced, reservoir pressure can decrease making it increasingly difficult to recover more of the oil and gas. Additional boreholes may be drilled into the reservoir to inject fluids that dislodge and displace the remaining oil and gas and add pressure to sweep them towards producers. Boreholes that are used for injecting fluids are called injectors or injection wells, and they can inject a range of fluids from water to polymer solutions and from liquid propane gas to carbon dioxide gas. The most popular choice, for example, is to inject water to displace oil towards production wells—a process known as waterflooding.

Optimizing a waterflood or other injection operation requires continuous analysis of large amounts of oilfield data and corrective actions. Waterflood surveillance classically apportions an oilfield into patterns of wells as units to monitor performance. Typically, an injector and its neighboring group of producers (an injector-based pattern) or alternatively a producer and its neighboring group of injectors (a producer-based pattern) are considered as single units for monitoring various reservoir performance parameters. Some patterns are simply defined by an area containing several injectors and producers. The amount of oil, for example, associated with a pattern—oil that has been displaced and oil that is remaining—is a key performance indicator. Other key indicators are the amount of oil and water produced and the average pressure of the pattern maintained by water injection.

Operators manage the performance of waterflood and injection operations by judiciously allocating injection and production capacity among the various patterns. But hydrocarbon reservoirs are geologically very heterogeneous. The data used to model such reservoirs is very limited and uncertain resulting in several equally likely models.

Streamline simulation is a numerical simulation method that has unique benefits for the modeling of injection-related recovery methods. First, it can accurately and efficiently simulate the displacement process in high resolution models of complex reservoirs. Second, streamline simulation produces information that directly quantifies the relationship between injectors and producers. Flow of fluids from injectors to producers is computed along streamlines that trace the movement of fluid particles. Well-rate allocation factors are a natural byproduct of streamline simulation. There is a strong visual component attached to the analysis of such information that is essential for management of waterflood operations. However, when reservoir models are large and complex and contain many wells, then current visual analysis systems can be cumbersome and error prone. What is needed is a system for visualizing producer-injector relationships and fluid flow along streamlines that are appropriate for large and complex reservoir models.

SUMMARY

Visualizing fluid flow in subsurface reservoirs is provided. An example system partitions flow information according to source-sink pairs and streamlines in a reservoir. The system displays dynamic streamline flow indicators and flow animations, such as 3D pie charts, to dynamically show flow contributions and properties at each well. A pie chart displayed at a producer well may have pie wedges that dynamically update to show the percentage of fluid being received via streamlines from each of multiple injectors. Highlighting the chart highlights all wells contributing to the output. Radial sections of each pie wedge may be further mapped to show the flow rate of components, such as oil, water, and gas phases in a streamline. Each chart may show many other properties and may be stacked across time steps. The system also displays streamline properties with animations, such as rolling marbles, which demonstrate flow velocity and model properties, such as phase components, rates, volumes, etc., through color and size codes.

This summary section is not intended to give a full description of visualizing fluid flow in subsurface reservoirs, or to provide a comprehensive list of features and elements. A detailed description with example implementations follows.

DETAILED DESCRIPTION

Overview

Figure 1:
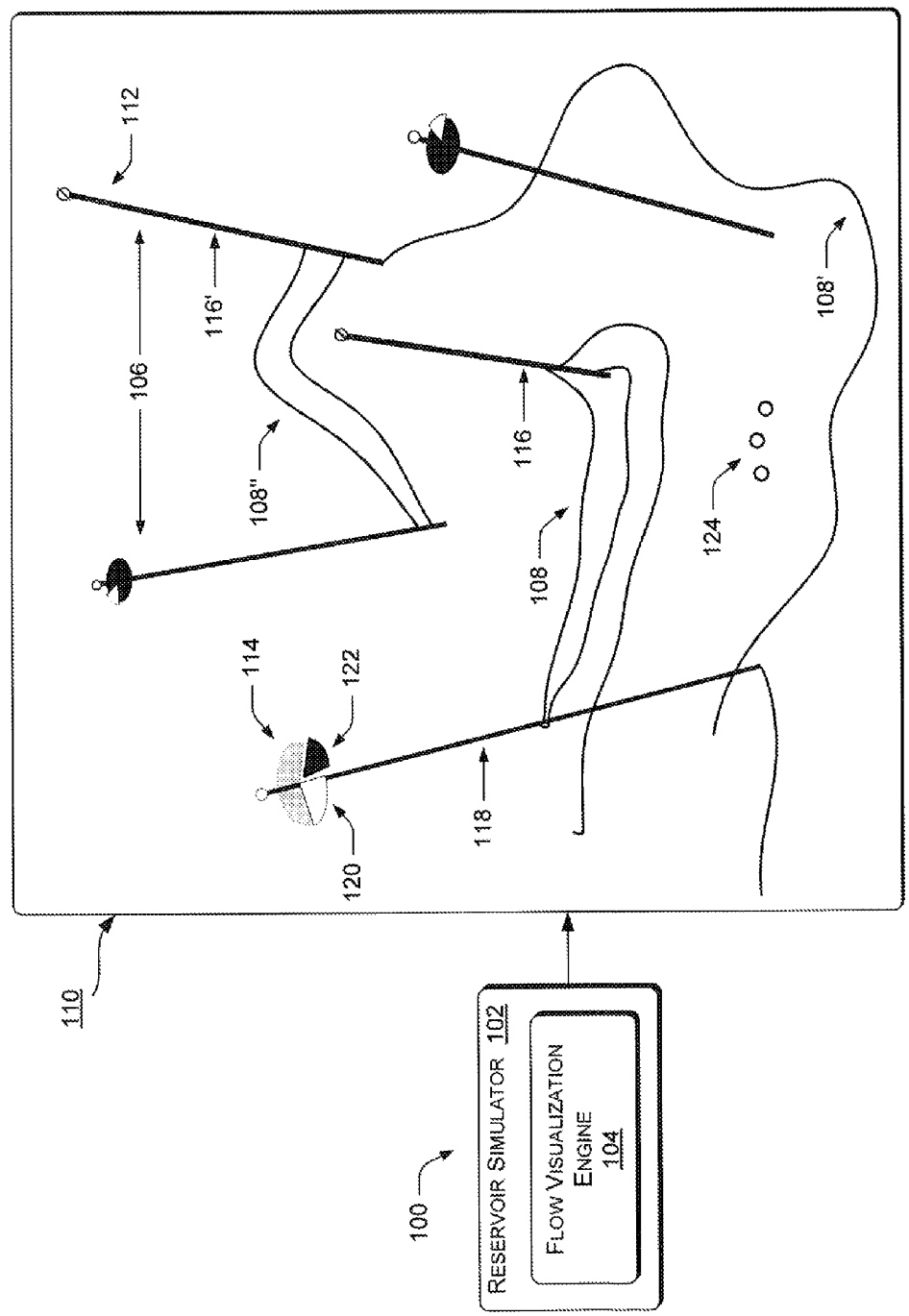
FIG. 1 is a diagram of an example reservoir simulation including dynamic streamline flow indicators and flow animations.

This disclosure describes visualization of fluid flow in subsurface reservoirs. In one implementation, as shown in FIG. 1, an example system 100 that includes a reservoir simulator 102 with a flow visualization engine 104, partitions fluid flow information according to source-sink pairs 106 and according to streamlines 108 in a reservoir being modeled for a simulation 110. "Flow information," as used herein, is used loosely to mean such data as grid-based flow data and/or streamline data. Although shown as part of the reservoir simulator 102 in FIG. 1, the flow visualization engine 104 can also be an external component with respect to the reservoir simulator 102. The example system displays a dynamic streamline flow indicator 112, such as a multi-component 3D pie chart 114, for each source 116 or sink 118 (usually wells) to dynamically show flow contributions to the sink 118 or from the source 116. Each source-sink pair 106 may have one or more streamlines 108 flowing between the source 116 and the sink 118 of the pair. Pie chart indicators 114 are used herein to exemplify dynamic streamline flow indicators 112. For example, a dynamic 3D pie chart indicator 114 at a producer well may have pie wedges 120 & 122 that display the percentage of fluid flow being received via multiple streamlines 108 from each of multiple injector wells 116. Each pie wedge 120 dynamically changes to display ongoing fluid flow for that streamline 108.

In one mode, highlighting a dynamic streamline flow indicator 114 highlights all wells in the simulation 110 that contribute to the output of the well, when the well is a sink 118; or highlights all wells that receiving flow from the well, when the well is a source 116. Radial sections of each pie wedge may be color-coded to show, for example, the flow rate of each component in a streamline 108, such as oil, water, and gas phases. The dynamic streamline flow indicator 114 for a source 116 or sink 118 may show many other properties. For example, stacked pie charts can show simulation time steps or progressive runs of the reservoir simulator. The system can also display streamlines 108 by assigning a property of each streamline to a visual animation. For example, rolling marbles 124 can show flow velocity and can be assigned color and size codes to show phase components, rate, volume, statistics, and many other properties.

The example systems and methods described below improve visual analysis of flow information produced by streamline models of underground reservoirs. Example techniques provide a higher quality visual analysis than those currently available. The dynamic streamline flow indicators 112, such as 3D pie chart indicators 114, are positioned locally and do not hinder display of other reservoir model features. The selected dynamic streamline flow indicators 112 overcome the complexities of displaying injector-producer relationships for complex wells with multiple laterals. Multi-dimensional pie chart indicators 114 are able to convey vast amounts of information intuitively and without cluttering a display. The ability to observe relationships directly is provided by interactive highlighting of source/sink pairs 116 and animation of flight-of-particles 124, and offers improved analysis capabilities and flexibility.

Example Environment

Figure 2:
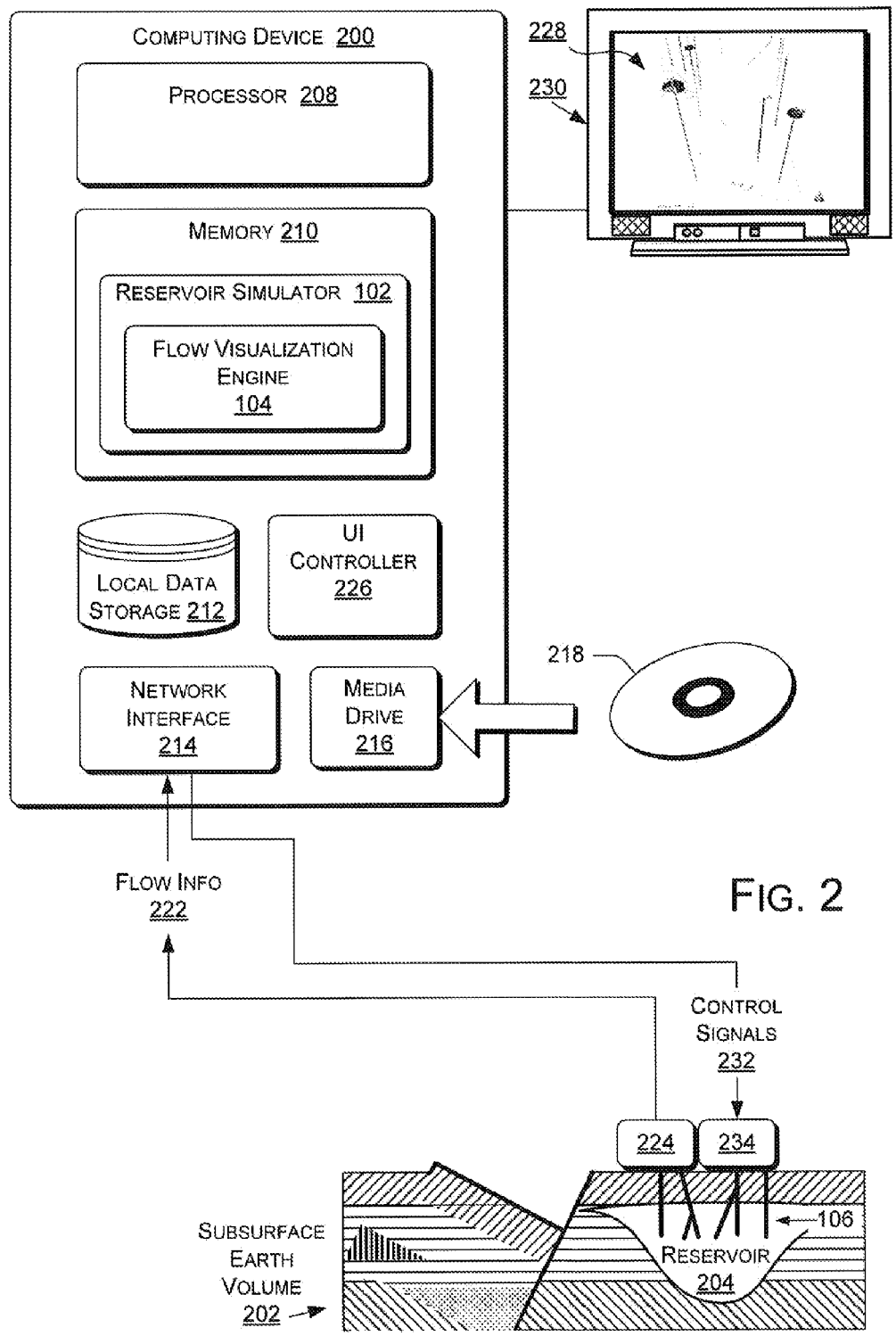
FIG. 2 is a block diagram of an example computing environment for performing visualization of fluid flow in a subsurface reservoir.

FIG. 2 shows the example system 100 of FIG. 1 in the context of a computing environment, in which visualization of fluid flow in a subsurface reservoir can be performed.

In this implementation, a computing device 200 implements a component, such as the reservoir simulator 102 that models a subsurface earth volume 202, including at least a reservoir 204, and where applicable, a depositional basin, petroleum reserve, seabed, etc. The reservoir simulator 102 is illustrated as software, but can be implemented as hardware or as a combination of hardware and software instructions.

In the illustrated example, the computing device 200 is communicatively coupled via sensory and control devices with a real-world setting, e.g., the actual subsurface earth volume 202, reservoir 204, depositional basin, seabed, etc., and associated wells, shown as source-sink pairs 106, for producing a petroleum resource, for water resource management, for carbon services, and so forth.

The computing device 200 may be a computer, computer network, or other device that has a processor 208, memory 210, data storage 212, and other associated hardware such as a network interface 214 and a media drive 216 for reading and writing a removable storage medium 218. The removable storage medium 218 may be, for example, a compact disk (CD); digital versatile disk/digital video disk (DVD); flash drive, etc.

In this example, the reservoir simulator 102 includes an example flow visualization engine 104, either integrated as part of the fabric of the reservoir simulator 102; as a separate module in communication with the reservoir simulator 102; or as a retrofit module added on, for example, to an updated version of a given reservoir simulator 102.

The removable storage medium 218 may include instructions for implementing and executing the example flow visualization engine 104. At least some parts of the example flow visualization engine 104 can be stored as instructions on a given instance of the removable storage medium 218, removable device, or in local data storage 212, to be loaded into memory 210 for execution by the processor 208.

Although the illustrated example flow visualization engine 104 is depicted as a program residing in memory 210, a flow visualization engine 104 may be implemented as hardware, such as an application specific integrated circuit (ASIC) or as a combination of hardware and software.

In this example system, the computing device 200 receives field data, such as fluid flow information 222, well logs, etc., from devices 224 in the field. The computing device 200 can receive the fluid flow information 222 from the field via the network interface 214.

The computing device 200 may compute and compile modeling and control results, and a display and/or user interface (UI) controller 226 may output geological model and simulation images, such as a 2D or 3D simulation 110 of reservoir 204 and fluid flow streamlines 108 on a display 230. The reservoir simulator 102 may also generate a visual user interface (UI) 228 for input of user data. The displayed simulation 110 is based on the output of the reservoir simulator 102, including the example flow visualization engine 104. The example flow visualization engine 104 may perform other modeling and control operations and generate useful user interfaces via the display controller 226, including novel interactive graphics, for visualizing fluid flow in subsurface reservoirs 204.

The example flow visualization engine 104 and reservoir simulator 102 may also generate or ultimately produce control signals 232 to be used via control devices, e.g., such as drilling and exploration equipment, or well control injectors and valves, in real-world control of a reservoir 204, transport and delivery network, surface facility, and so forth.

Thus, an example system 100 may include a computer device 200 and interactive graphics display unit 230. The computing system as a whole constitutes a reservoir modeling application and hardware that can read flow information, such as grid-based flow data, streamline data, and/or related model data. That is, the system can process streamline data as well as grid-based flow data and related model data. The data may be produced by a streamline or finite difference porous medium fluid flow simulator. In one implementation, the system can read streamlines 108 directly from FRONTSIM (streamline) or can read flow data from ECLIPSE (finite-difference), and subsequently create streamlines 108 (Schlumberger Ltd., Houston Tex.). The system can also read flow data from FRONTSIM and subsequently generate streamlines 108. FRONTSIM and ECLIPSE are merely two possible software packages that can produce flow information, the flow information can be produced by any other suitable software known in the art.

The system of FIG. 2 associates reservoir simulation data objects with a given geological model. The system can identify or generate streamlines 108, and group the streamlines 108 into appropriate source and sink objects for analysis and visualization.

Example Engine

Figure 3:
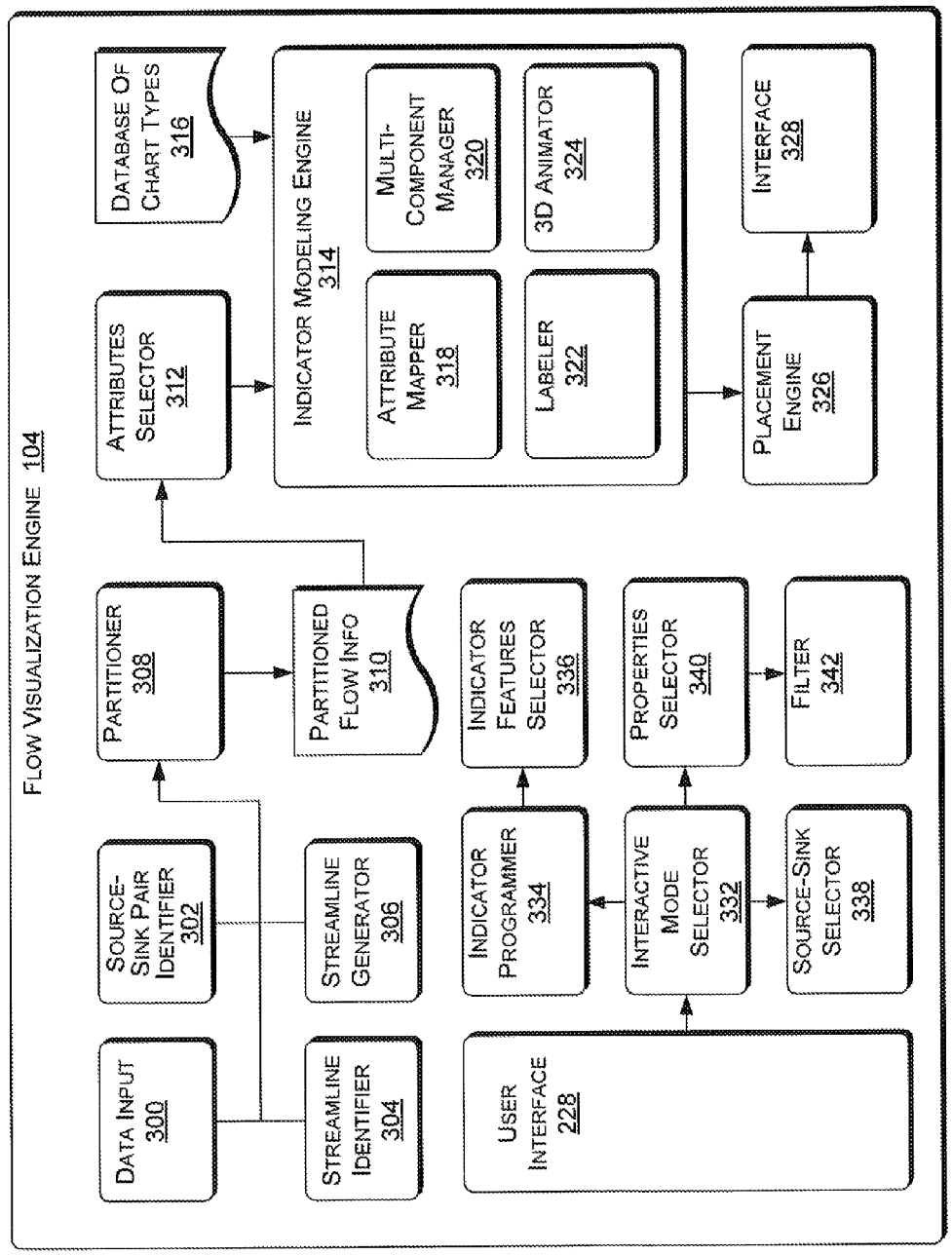
FIG. 3 is a block diagram of an example flow visualization engine.

FIG. 3 shows an example flow visualization engine 104 in greater detail than in FIG. 1 and FIG. 2. The illustrated implementation is only one example configuration for the sake of description, to introduce features and components of an engine that performs innovative visualization of fluid flow characteristics and streamlines in reservoir simulations 110. The illustrated components are only examples. Different configurations or combinations of components than those shown may be used to perform the visualization and animation functions, and different or additional components may also be used. As introduced above, the example flow visualization engine 104 can be implemented in hardware, or in combinations of hardware and software. Illustrated components are communicatively coupled with each other for communication as needed. Arrows are shown only to suggest process flow or data flow, since the components can communicate with each other as needed.

The illustrated flow visualization engine 104 includes components for partitioning flow information, components for interacting with a user, and components for modeling dynamic streamline flow indicators 112, among others. A list of components includes a data input 300, which may be a buffer or interface, a source-sink pair identifier 302, a streamline identifier 304, a streamline generator 306, a partitioner 308, and a buffer or storage for partitioned flow information 310. Further, the example engine 104 includes an attributes selector 312, an indicator modeling engine 314, a database of chart types 316; an attribute mapper 318, a multi-component manager 320, a labeler 322, a 3D animator 324, a placement engine 326, and an interface 328 for communicating with a display controller 226 and/or a larger reservoir simulator 102. The illustrated flow visualization engine 104 further includes a user interface 228, an interactive mode selector 332, an indicator programmer 334, an indicator features selector 336, a source-sink selector 338, a properties selector 340, and a filter 342. Operation of the example flow visualization engine 104 will be described below.

Operation of the Example Engine

Functional Highlights

The example flow visualization engine 104 can model source-sink pairs 106 and many properties of multiple streamlines 108 simultaneously, through the partitioned flow information 310. An important function of the flow visualization engine 104 is to utilize various incoming data, such as flow data or streamline data, which can then be partitioned and made suitable for display as dynamic streamline flow indicators 112. The data input 300 receives flow data or streamline data or both, which can then be processed by a combination of the source-sink pair identifier 302, the streamline identifier 304, and/or the streamline generator 306, depending on the nature and source of the incoming data. Multi-component pie chart indicators 114 and stacked bar graphs can be selected from the database of chart types 316. The database of chart types 316 may allow a user to select from numerous types of dynamic charts and graphs for use in a simulation 110, with styles including a 2D or 3D pie chart, a multi-component pie chart, a bar chart, a thermometer chart, a dial, a gauge, a meter, a graph, a histogram, a line graph, an area chart, a waterfall chart, a polar chart, a timeline chart, a tree chart, a flow chart, a radar chart, a bubble chart, a candlestick chart, a probability plot, a scatterplot, a bi-plot, or a Venn diagram.

In one implementation, the source-sink partitioned data 310 are displayed as 3D pie disks 114 located at the relevant source 116 or sink 118, where the angle subtended by each pie wedge (e.g., 120 & 122) represent fractions of a source attribute or a sink attribute that is related to another sink 118 or source 116, respectively, of the source-sink pair. The labeler 322 may apply a human-readable description to visually identify the source-sink pairs 106. The attribute mapper 318 may use the radius and color of an animated pie chart indicator 114 to convey information related to the source 116 or sink 118. Similarly, each pie wedge 120 can be divided into cylinders or sectors along different radii and colored appropriately to convey further information about the particular source-sink pair 106.

The indicator modeling engine 314 may superimpose additional pie disk indicators 114 over the original in the simulation 110. This can imply information of a similar type but acquired from different simulation runs or between different time steps of the same run. Such information may also be displayed as a multiplier.

Source-sink relationships may be visualized interactively using different modes mediated by the interactive mode selector 332. Different modes display streamline and grid cells with specific properties related to the source-sink pair 106. The source-sink selector 338 allows a user to select a pie wedge 120 using, for example, a computer mouse to highlight the associated sinks 118 or sources 116. Optionally, the user may add streamlines or grid cells related to the source-sink pair 106 to the simulation 110.

The properties selector 340 and filter 342 allow the user to filter the number of streamlines or grid cells displayed using various criteria. The properties selector 340 enables the user to manually select an attribute for visual indication, in a manner similar to the attribute selector 312 designating an attribute for display by the indicator modeling engine 314. Iso-surfaces may be visualized using properties on the filtered grid cells. There are many properties of reservoirs 204, fluid resources, geological formations, streamlines, and multiple well patterns that a user can choose for to be filter criteria and/or to be visualized by a dynamic streamline flow indicator 112 or a visual animation 124. A partial list of such properties includes a flow rate, a production rate, a flow volume, a pressure, an average pressure, a mean pressure, a weighted pressure, a standard deviation, an uncertainty value, a temperature, an oil saturation, a water saturation, a gas saturation, a porosity, a pore volume, a permeability, a time, a hydrocarbon composition, a fluid component, a component ratio, a water to oil ratio, a sandstone to shale ratio, an index of heterogeneity, a Dykstra-Parson coefficient, a Lorentz coefficient, a difference in a geological or reservoir model parameter over two different times, a time step, or a statistical parameter. Each of these properties may be selected and modeled by a dynamic streamline flow indicator 112.

The indicator modeling engine 314, including the 3D animator 324, can display particle collections as animations that provide meaningful information about the properties. For example, a fluid flow along a streamline 108 may be visually displayed as marbles 124 rolling along the streamline at speeds equal to the velocity of the different types of fluid particles. Color, size, and other characteristics of the animated object can be used to distinguish various properties. For example, liquid oil at a certain flow volume may be a marble of one size, color, and speed, while liquid water may be modeled by a rolling marble with a different size, color, and speed. Thus, the size, color, and speed of the animated spheres can be related to properties along the streamline 108. A static trail of images of the animated objects (such as images of smaller, transparent, or otherwise distinguishable spheres) may be "left behind" and visible for a time to provide static representation of what has been animated.

Detail of Features

Typically, geophysical data, geological data, reservoir engineering data, and production data are gathered, analyzed, interpreted, and utilized to build a reservoir model. This can be accomplished by a commercially available computer program, such as PETREL software (Schlumberger Ltd., Houston, Tex.). There may be several realizations of the reservoir model due to uncertainty in the input data. Such a reservoir model is then used to conduct fluid flow simulations using a streamline simulator such as a version of FRONTSIM, or alternatively using a finite volume/finite difference-based simulator such as an ECLIPSE program (Schlumberger Ltd., Houston, Tex.).

For example, streamline results produced by such a simulator may be read by a post-processing application for visualization. A commercial application such as PETREL can be used to perform such operations. PETREL can also be used to create and execute models for both ECLIPSE and FRONTSIM. ECLIPSE results can be post-processed by PETREL or FRONTSIM to generate flow information.

In one implementation, the example flow visualization engine 104 may read (receive) incoming data at the data input 300, which can be either flow data or streamline data that includes the traces of streamlines 108 and their scalar and vector properties. The streamline identifier 304 may determine streamlines 108 represented in the data when the received data is streamline data, while the streamline generator 306 may create streamlines 108 when the received data is flow-based grid data only. The incoming data may be sorted into well pairs, e.g., by the source-sink pair identifier 302, including "pseudo-wells" to represent grouped streamline source 116 (start) and sink 118 (end) points. The concept of categorization of streamline data by start and end points can be extended to cover any engineering object of interest such as well completions, laterals reservoir zones, aquifers, etc. Considering each well by itself, the partitioner 308 can group flow rates among completions, zones, and laterals belonging to that particular well. Well-pair or source-sink relationships can be defined by the source-sink pair identifier 302 at the individual injector-producer pair level or at the pattern level. An injector-based pattern is associated with injectors and includes all connected producers or other sinks 118 such as aquifers. Similarly, a producer-based pattern is associated with the producer and includes all connected injectors or sources 116, such as aquifers.

In the simulation 110, trajectories of the wells can be displayed in a 3D view. The labeler 322 may display human-readable symbols and descriptions to identify the wells. The start and end point identifiers of streamlines are matched to the well names. The attribute mapper 318 reads the injection and production allocation fractions as scalars from the streamline information in the partitioned flow information 310, and the indicator modeling engine 314 draws the dynamic indicators, such as the 3D pie chart indicators 114, for the placement engine 326 to locate near each well. In one implementation, the indicator programmer 334 enables the user to customize the dynamic streamline flow indicators 112. For example, the indicator features selector 336 may allow the user to choose to have the 2D top-face of the pie chart indicators 114 show (FIG. 5) for easier analysis, rather than a 3D view.

Using pie disk indicators 114 as an example indicator, the placement engine 326 can locate the pie chart indicator 114 on the display of the well trajectory, at the top or the reservoir model by default. Through the user interface 228 and the indicator features selector 336, the user can change the location of this placement if desired. If the pie chart indicator 114 or other dynamic streamline flow indicator 112 is to be placed at a well completion, then the indicator can be located at the top, center, or bottom of the completion as desired by the user.

Figure 4:
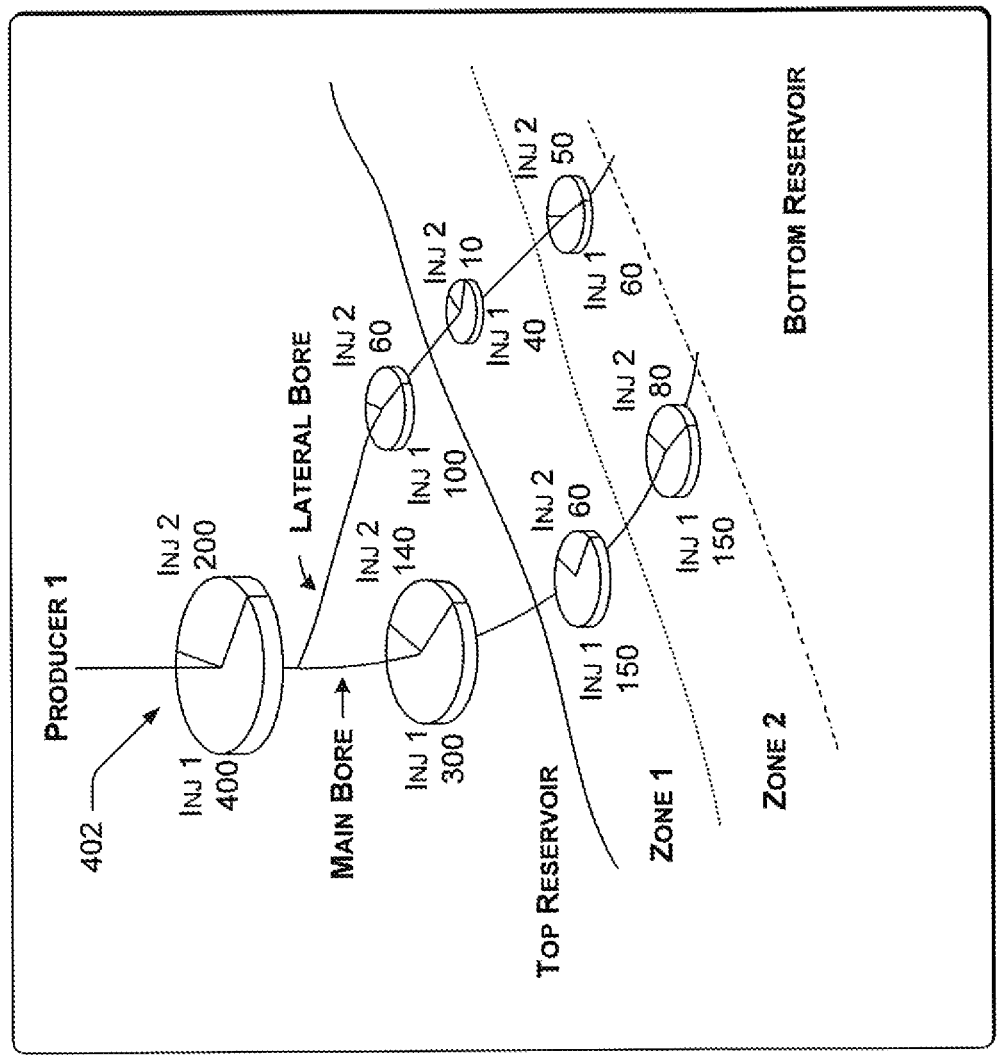
FIG. 4 is a diagram of 3D pie indicators on a complex well.

FIG. 4 shows 3D pie chart indicators 114 on a complex well with one lateral. The illustration shows production supported by two injection wells at each of a well level, a lateral level, and a zone/completion level. For wells with a lateral boreholes or multi-laterals, as shown in FIG. 4, the placement engine 326 can locate the pie disk indicators 114 on the lateral trajectories using similar rules as for single bore wells and completions. Pie disk indicators 114 can be displayed simultaneously for all levels of granularity—on the well, on the lateral, on the completion, etc., as shown in FIG. 4. The relative sizes of the pie chart indicators 114 can be made proportional to contributing fractions of the individual well components or proportional to the whole well. Thus, the pie indicator 402 for the entire production well is the largest pie indicator 402 shown.

Figure 5:
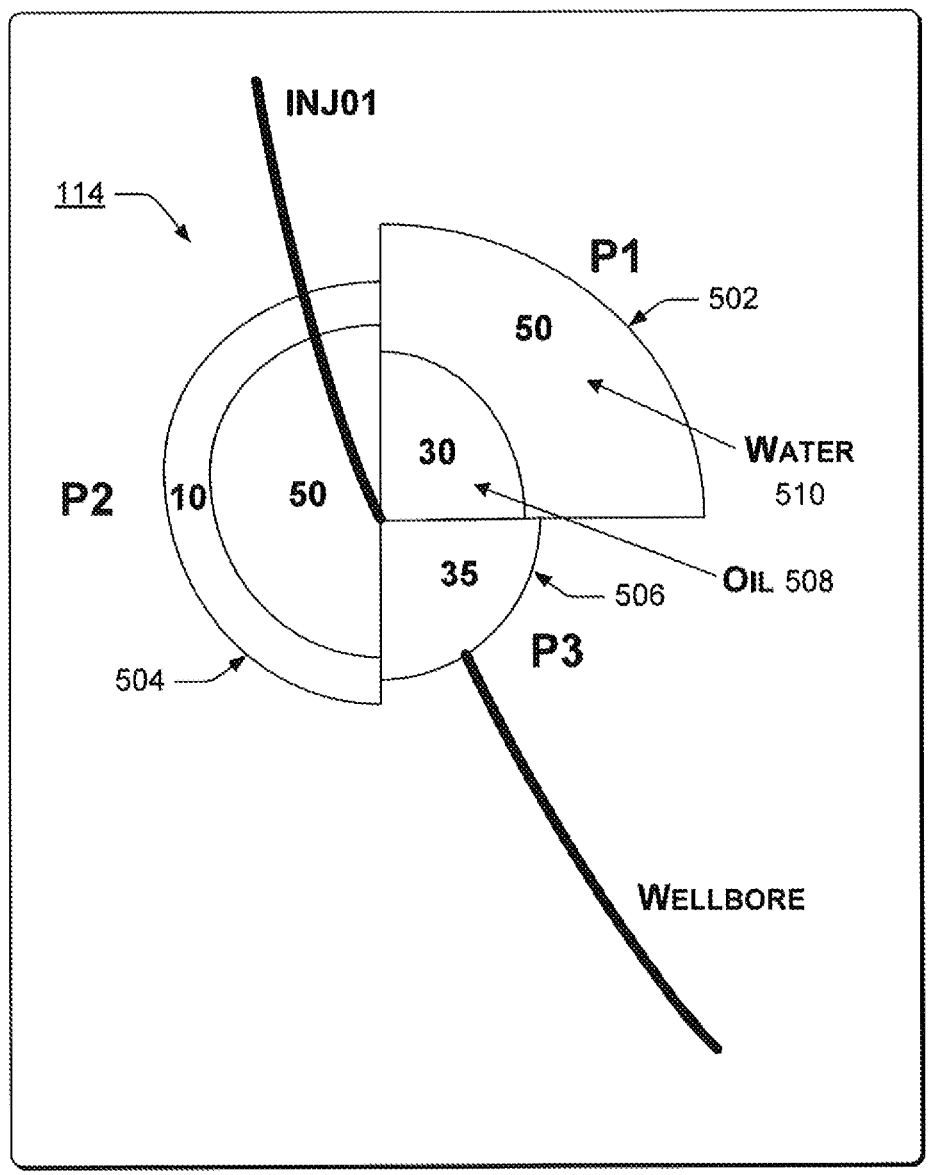
FIG. 5 is a diagram of a multi-dimensional 3D pie indicator on an injection well showing production supported at three producers.

FIG. 5 shows a multi-dimensional 3D pie chart indicator 114 on an injection well showing production supported at three producers. The injector is re-cycling water through producer P3 and has broken through in producer P1. As show in FIG. 5, each wedge 120 of a pie chart indicator 114 can be associated with a different producer-injector well or completion pair, or a pattern.

In general, implementation of multi-component indicators can be extended to any source-sink object combination. For example, an injector (e.g., 116) may have a pie chart indicator 114 displayed with a number of wedges (502, 504, 506) equal to the number of producers that the injector supports. The angle subtended by each pie wedge 502 can be proportional to the allocation fraction for the relevant producer. In general, the angle of the pie wedge 502 may be proportional to any quantity related to the injector-producer pair that can be represented as a fraction.

Given that a pie chart indicator 114 is based on a radial coordinate system, the attribute mapper 318 and the multi-component manager 320 can scale the radius of the pie or pie wedges to any well property of interest. The radii of the pie chart indicators 114 are then proportional to the property displayed. However, depending on implementation, the radii of pie chart indicators 114 may be controlled by other parameters or kept fixed and scaled relative to the view of the simulation 110 displayed. Pie wedges 502 are not limited to having a common radius. A second parameter can be displayed along the radius of the pie wedge 502. Through the user interface 228, the user may choose to display several properties sharing the same scale or multiple versions of a property on a pie wedge 502 by superposition of wedges that subtend the same angle as the original wedge 512 but are different cylindrical sections and/or delineated at different radii by arcs. For example, the attribute mapper 318 may assign a total volumetric flow rate, from a connection into a producer well, to a first pie wedge 502 of a pie chart indicator 114 located on the producer. On this pie wedge 502 a second wedge 508 may be superimposed to show the amount of oil that is flowing into the producer. A third wedge 510 can be superimposed to show the amount of water that is being produced. The original wedge 502 is therefore partitioned along the radius to show fractions or absolute values of individual phase productions that make up the total volumetric rate.

In general, arcs or circles can be displayed on disks or pie chart indicators 114 to compare two simulations or to plot statistical moments for a property derived from several simulation runs. Superimposed pie charts can be displayed to convey changes in plotted data over two dates, two or more runs, or for two different models for the same subsurface reservoir 204. The change in the value of a parameter associated with a connection may be computed as a ratio and displayed as an arc along the radius of the pie wedge 502. The multi-component manager 320 can apply colors to the entire pie chart indicator 114 or to individual pie wedges 502 to represent various properties of interest.

All pie wedges 502 of a pie chart indicator 114 may have a fixed radius or each pie wedge 502 can have its own radius to represent a value. For example, the user may wish to compare a change in allocation fractions over two time steps or compare the allocation fraction from two models or simulation cases. The attribute mapper 318 and the multi-component manager 320 may display the first time step or case as the reference indicator 114 and superimpose the information from the second case on the reference indicator 114. Arcs can be drawn on the wedges to show the two instances. The information from the second case is preferably displayed as a multiple of the reference case. However, absolute values may also be used.

In one implementation, pie chart indicators 114 with different wedge radii are constructed by the indicator modeling engine 314 to display information at the pattern level. For example, the multi-component manager 320 may divide the pie indicator 502 into two wedges according to angle, e.g., 180 degrees each. Then, for a pattern of. e.g., an injector and multiple producers, the radius of one wedge may represent the rate of injection at the injector and the radius of the other wedge represents the production rate of the collective pattern producers.

A user may select a pie wedge 502 to execute an animation of the associated streamline(s) 108. The user may even select a source 116 or a sink 118 in its entirety, to animate all associated streamlines 108. In one implementation, both producer and injector pie chart indicators 114 can be displayed simultaneously in a simulation 110 for all wells or, for only a selected few. By default, when the user avails of the source-sink selector 338 (e.g., by clicking on a well with a mouse) or when the flow visualization engine 104 automatically makes a selection, the selection of an injector automatically causes a selection of the connected producers, and selection of a producer automatically causes selection of connected injectors. Pie wedges 502 can be labeled with the connected well name and the value of the fraction. Pie wedges 502 can be color-coded based on colors associated with the connected wells. Alternatively, the pie chart indicator 114 may be colored based on a third property, such as pressure. Similarly, the radius of the pie chart indicator 114 can be scaled to the maximum and minimum well production and injection rates.

Figure 6:
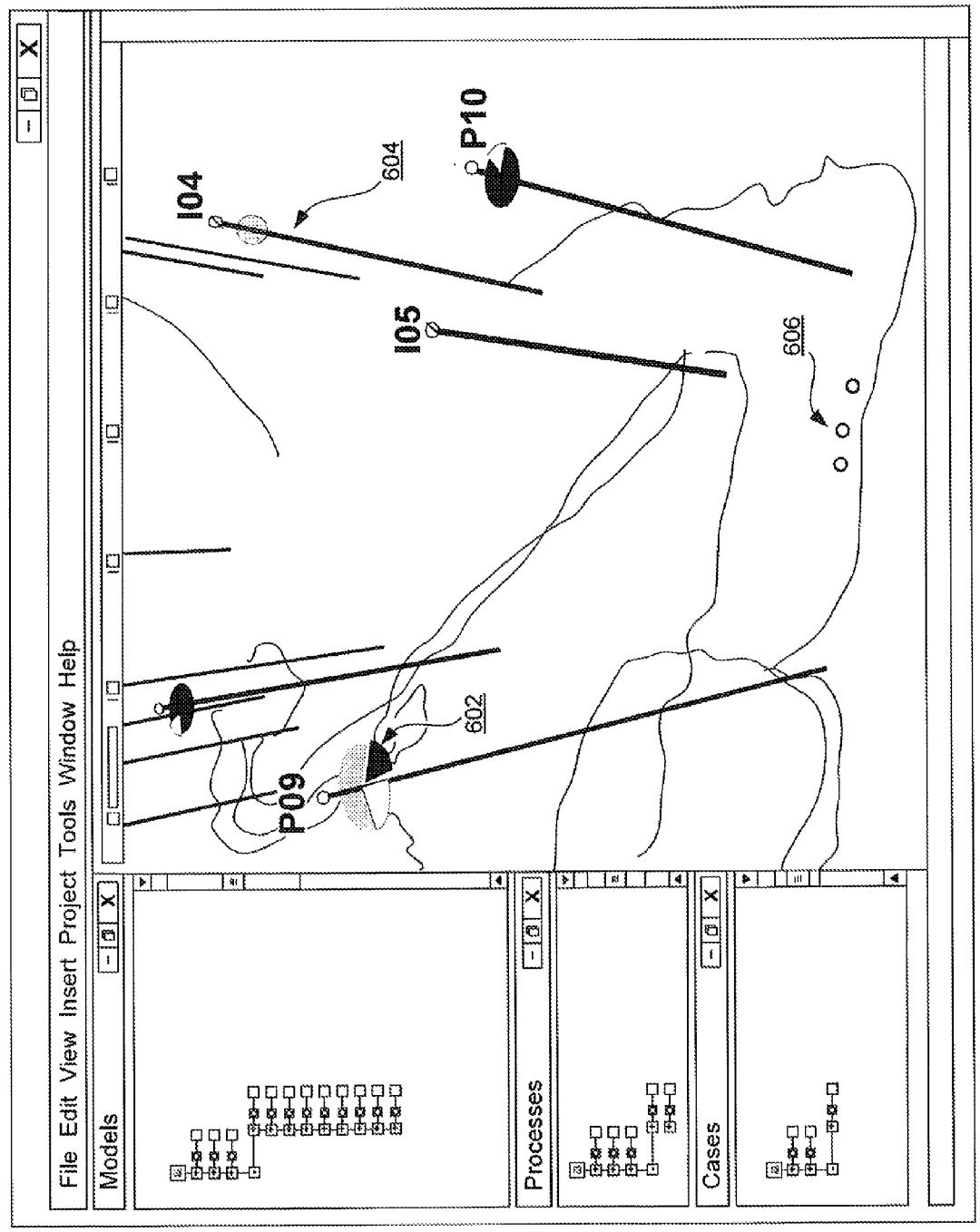
FIG. 6 is screenshot of a user interface pane showing 3D pie indicators displayed on producers.

FIG. 6 shows an example user interface 228 pane showing 3D pie chart indicators 114 on producers. Selecting the relevant pie wedge 602 on well P09 causes the connected injector I04 (604) to be highlighted. Three (colored) balls 606 move from I04 towards P09 along the shorted streamline. The moving balls 606 in FIG. 6 represent the general concept of animating the selected streamlines 108. In this reservoir simulation 110 and user interface 228, the user can select a pie wedge 602 of a pie chart indicator 114 in 3D and the system highlights the associated well or wells in the pattern. The user may choose to show streamlines 108 connecting the well pair(s) 106 and then apply the properties selector 340 and the filter 342 (either manually or automatically) to screen the number of streamlines 108 displayed based on selected criteria, e.g., the quickest flow path. Additionally, the 3D animator 324 may display flight-of-particle animations along the selected paths, for example, by releasing balls or other indicators that flow along the streamlines 108. Balls or other visual objects representing particles can be released at regular time intervals and they may move along the streamline trace connecting the well pair 106 at a velocity representing their assigned actual speed or other assigned property.

In one implementation, the 3D animator 324 tracks streamline animation speed based on the time-of-flight values along the streamline 108. One purpose is to visualize the velocity of the flow at any one point in space for a specified simulation time step. In one implementation, the 3D animator 324 applies an algorithm that calculates the animation speed by dividing the total time-of-flight into "N" equivalent intervals. Subsequently, the 3D animator 324 searches the streamline 108 to find positions corresponding to the sampled time-of-flight values. The resulting set of points is equidistant with respect to time-of-flight. The distances in between balls or visual objects animating the streamline(s) vary in a meaningful manner, so that longer distances represent slower change in time-of-flight (i.e. faster moving fluid) and vice versa. Displaying a visual object on these points in sequence and in regular time intervals provides an animation with good illusion of varying speed. Displaying more than one visual object helps with the perception of speed because as the velocity is higher, the intervals are longer in between individual marbles 124, and vice versa.

In one implementation or display mode, a trail of static visual objects (e.g., marbles) can be left behind, as the visual objects 124 move past a point. This is to provide a static representation of the animated event having occurred, which is particularly useful when a static or non-interactive report is to be generated. The number and/or density of the static images may vary. The static trail can display the same information as the animation itself, e.g., distances in between the static images 124 indicate velocity, colors indicate phases, size indicates volume, etc.

The 3D animator 324 can loop the animation so that users continuously observe the movement of the visual images from injector to producer in the simulation 110. The visual images can be color-coded based on properties like phase saturation, e.g., of water, along the streamline 108. Through the user interface 228, the user can select more than one pie wedge 120 at a time, and observe the relative speed of movement of moving streamline animations (e.g., marbles) along different streamlines (108, 108', 108"). The multi-component manager 320 and the 3D animator 324 can extend the animation to visual objects moving at speeds based on phase mobility, i.e., oil, water and gas, and their phases move at relatively different speeds along the streamline 108. For example, moving marbles can be colored according to fluid phase and their size coded according to saturation or flow rate by the attribute mapper 318.

In one implementation, the dynamic streamline flow indicators 112, 3D pie chart indicators 114, pie wedges 120, and/or animated visual objects 124 are displayed as icons, which when selected by clicking a mouse, pop up a textual readout of the different properties and values being represented by the animated indicator or moving icon.

Figure 7:
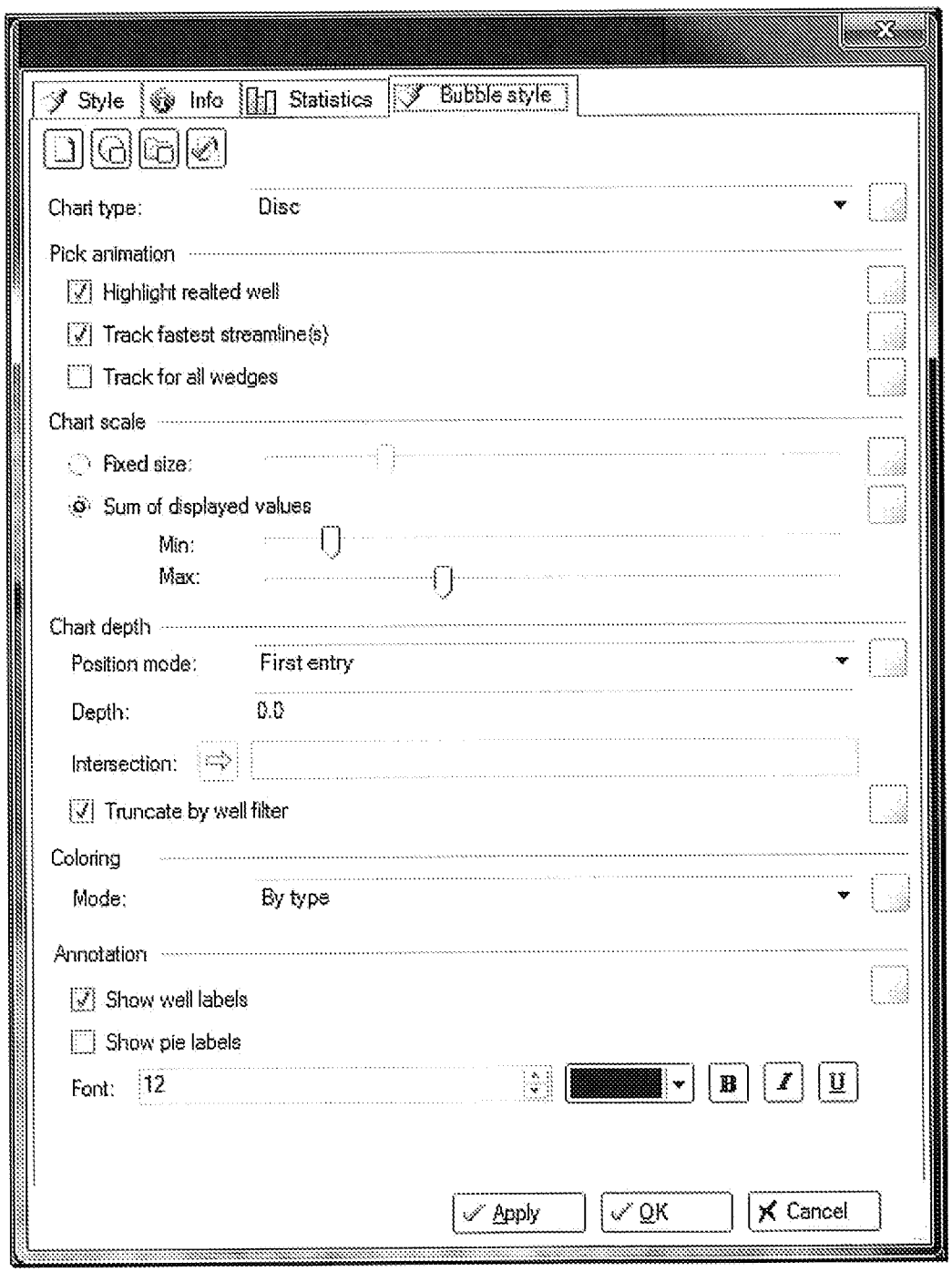
FIG. 7 is screenshot of a graphic user interface allowing the user to control various visualization options related to display of dynamic streamline flow indicators.

FIG. 7 shows an example user interface 228 for adjusting settings of a simulation 110, powered at least in part by the example flow visualization engine 104. The example user interface 228 presents various options to the user, including options for selecting a chart type from the database of chart types 316, options for compiling statistics, options for selecting animation features, visual scaling options, chart depth options, coloring options, annotation options, text and labeling options, and so forth. For example, the user may choose to animate a certain individual streamline 108, all streamlines of a pattern, or streamlines associated with all pie wedges. The illustrated user interface 228 is only an example, and is not meant to comprehensively embody all setting adjustments that can be applied to the example flow visualization engine 104 or to a generated simulation 110.

Example Methods

Figure 8:
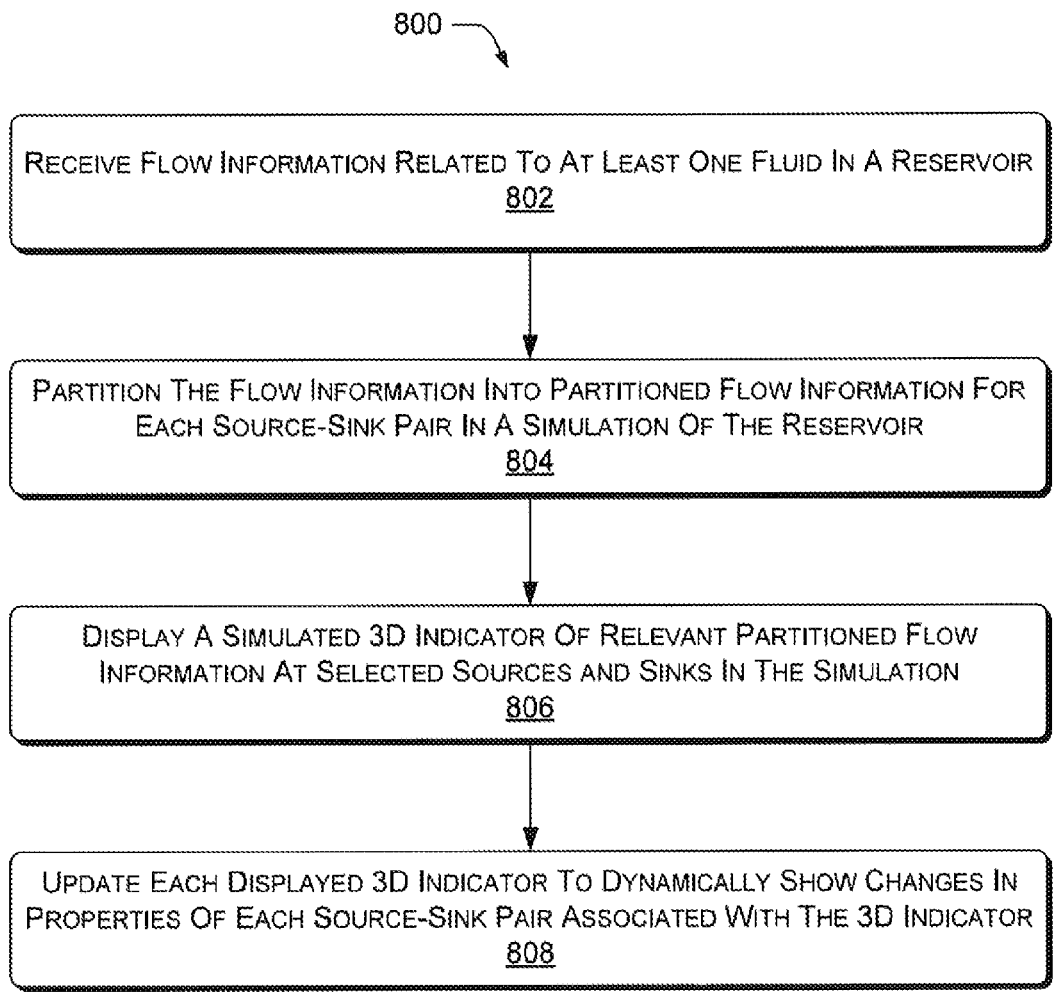
FIG. 8 is an example method 800 of displaying a simulated 3-dimensional (3D) indicator of relevant partitioned flow information at each of one or more sources or sinks in a reservoir simulation.

FIG. 8 is an example method 800 of displaying a simulated 3-dimensional (3D) indicator of relevant partitioned flow information at each of one or more sources or sinks in a reservoir simulation. In the flow diagram, the operations are summarized in individual blocks. The example method 800 may be performed by hardware or combinations of hardware and software, for example, by the example flow visualization engine 104.

At block 802, flow information related to at least one fluid in a reservoir is received.

At block 804, the flow information is partitioned into flow information for each source-sink pair in a simulation of the reservoir.

At block 806, a simulated 3D indicator of relevant partitioned flow information is displayed at selected sources and sinks in the simulation.

At block 808, each displayed 3D indicator is updated to dynamically show changes in properties of each source-sink pair associated with the 3D indicator.

A source may be an injector well that originates a streamline in the simulation and the sink may be a production well that produces from the streamline. The simulated 3D indicator can be a 3D pie chart indicator that is animated to display changing streamline qualities in the real-time of the simulation.

Each pie wedge of the pie chart indicator may have a magnitude to represent a value of a source or sink attribute. The pie chart indicator may manage multiple properties, and concurrently display many different characteristics and aspects of multiple streamlines and the fluids therein, with respect to a given single well.

Each pie wedge of a pie chart indicator can display the contribution of a different streamline, or a phase component of a single streamline, etc.

Pie wedge characteristics can represent different attributes of the source-sink pair being represented by the pie chart indicator. Some example pie wedge characteristics include wedge color, wedge transparency, overall wedge radius, a wedge label, and wedge thickness.

Pie chart indicators and pie wedges thereof can be subdivided to show component phases and other properties of multiple streamlines. Pie charts and wedges may also be superimposed to show different runs of the same simulation.

A user interface allows an operator select dynamic streamline flow indicators, and generally customize the set-up. The user can program the simulation to become a tool for visualizing surfaces, key flows, optimal injection and production rates, and so forth.

Figure 9:
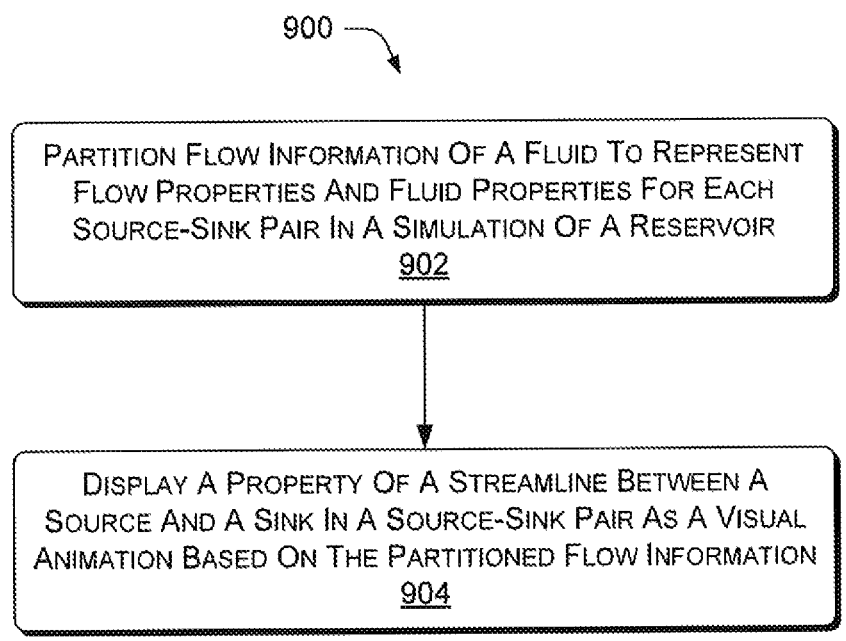
FIG. 9 is an example method 900 of displaying a property of a streamline as a visual animation.

FIG. 9 is an example method 900 of displaying a property of a streamline as a visual animation. In the flow diagram, the operations are summarized in individual blocks. The example method 900 may be performed by hardware or combinations of hardware and software, for example, by the example flow visualization engine 104.

At block 902, flow information of a fluid is partitioned to represent flow properties and fluid properties for each source-sink pair in a simulation of a reservoir.

At block 904, a property of a streamline between a source and a sink in a source-sink pair is displayed as a visual animation based on the partitioned flow information.

The visual animation is typically located or placed along a display of the streamline between the relevant source and the sink, where an attribute of the visual animation represents a property of the streamline.

The visual animation may be one or more moving balls, rolling marbles, moving arrows, or waving lines, in which dimensions of the visual objects selected for the animation and distances between instances (e.g., a sequence of rolling balls) indicate a property being modeled.

For example, a speed of a rolling marble may simulate a velocity property of fluid particles moving along the streamline. Relative speeds of the rolling marbles may indicate relative mobilities of phases or components along the streamline. Varying distances between rolling marbles may simulate a velocity property. Color of the rolling marbles may indicate a component or phase saturation of a component of the fluid along the streamline. A size of the rolling marbles may indicate a volume, saturation, or flow rate, etc.

The visual animation may leave a temporary or permanent trail, to bind the display of a property long enough to make a report, etc.

A user may choose to view visual animations of multiple source-sink pairs at one time for displaying relative speeds of multiple fluids and multiple components of fluids all moving along different streamlines with different flow properties.

CONCLUSION

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed systems, methods, and structures.

The invention claimed is:

1. A non-transitory computer-readable storage medium tangibly containing instructions, which when executed by a computer, perform a process, including:
    receiving flow information related to at least one fluid in a reservoir;
    partitioning the flow information into partitioned flow information for each source-sink pair in a simulation of the reservoir;
    displaying dynamically in a real-time of the simulation a simulated 3-dimensional (3D) indicator of relevant partitioned flow information at each of one or more sources or sinks in the simulation; and
    updating each simulated 3D indicator to dynamically in the real-time of the simulation show changes in properties of each source-sink pair associated with the 3D indicator;
    wherein the simulated 3D indicator comprises a 3D pie chart, wherein the 3D pie chart comprises a multi-component 3D pie chart for representing an individual well paired with multiple other wells in source-sink pairs;
    wherein when the individual well comprises a source, then each pie wedge of the 3D pie chart associated with the source represents partitioned flow information for a different respective source-sink pair that includes the source;
    wherein when the individual well comprises a sink, then each pie wedge of the 3D pie chart associated with the sink represents partitioned flow information for a different respective source-sink pair that includes the sink; and
    wherein at least one wedge of the multi-component 3D pie chart is radially divided into cylinder sections by arcs at different radii, each cylinder section representing a different attribute of the source-sink pair or an associated streamline being represented by the wedge.

2. The non-transitory computer-readable storage medium of claim 1, wherein the source and the sink are defined with respect to one or more streamlines, including one of:
- wherein the source comprises an injector well that originates a streamline in the simulation and the sink comprises a production well that produces from the streamline;
- wherein the source represents a grouped streamline start point and the sink represents a grouped streamline end point;
- wherein the source and sink represent engineering objects including one of a well completion, a lateral reservoir zone, or an aquifer;
- wherein the source comprises a pattern that includes multiple connected sources, injectors, or aquifers; or
- wherein the sink comprises a pattern that includes multiple connected sinks, producers, or aquifers.

3. The non-transitory computer-readable storage medium of claim 1, wherein a magnitude of each pie wedge, or an angle subtended by each pie wedge, of an individual 3D pie chart represents one of:
- a value of a sink attribute related to an associated source in a source-sink pair; or
- a value of a source attribute related to an associated sink in a source-sink pair.

4. The non-transitory computer-readable storage medium of claim 1, wherein each wedge characteristic represents a different attribute of the source-sink pair being represented by the wedge, the wedge characteristics selected from the group of wedge characteristics consisting of a wedge color, a wedge transparency, an overall wedge radius, a wedge label, and a wedge thickness.

5. The non-transitory computer-readable storage medium of claim 1, wherein each cylinder section represents an attribute of a different fluid component in the fluid.

6. The non-transitory computer-readable storage medium of claim 1, further comprising instructions for superimposing multiple 3D pie charts over each other to create visually stacked 3D pie charts to display one of:
- different runs of the simulation of the reservoir; or
- different time steps of the simulation of the reservoir.

7. The non-transitory computer-readable storage medium of claim 1, wherein the simulated 3D indicator dynamically displays at least one attribute of the partitioned flow information for a source-sink pair, the attribute selected from the group of attributes consisting of:
- a flow rate, a production rate, a flow volume, a pressure, an average pressure, a mean pressure, a weighted pressure, a standard deviation, an uncertainty value, a temperature, an oil saturation, a water saturation, a gas saturation, a porosity, a pore volume, a permeability, a time, a hydrocarbon composition, a fluid component, a component ratio, a water to oil ratio, a sandstone to shale ratio, an index of heterogeneity, a Parson's quotient, a Laurent theorem result, a difference in a geological formation at two different times, a time step, or a statistical parameter.

8. The non-transitory computer-readable storage medium of claim 1, further comprising instructions for providing interaction modes for a user to interact with the simulation through a user interface, including one of:
- providing a first interaction mode for displaying a streamline or grid cells associated with a specific property of an individual source-sink pair;
- providing a second interaction mode for selecting a pie wedge at a source to automatically highlight an associated sink, and for selecting a pie wedge at a sink to automatically highlight an associated source; and
- providing a third interaction mode to highlight all sources and sinks associated with an individual source or sink in response to a user selecting the simulated 3D indicator displayed at the individual source or sink.

9. The non-transitory computer-readable storage medium of claim 8, further comprising instructions for selecting a property associated with a source-sink pair to perform one of:
- filtering a number of streamlines or grid cells related to the source-sink pair using the property as a filter criterion; or
- displaying an iso-surface in the simulation by applying the selected property as a filter.

* * * * *